Aug. 1, 1967
C. C. FAUST ET AL
3,334,004
APPARATUS FOR CUTTING AND RADIANT HEAT
SEALING THERMOPLASTICS
Filed Feb. 25, 1964
2 Sheets-Sheet 1
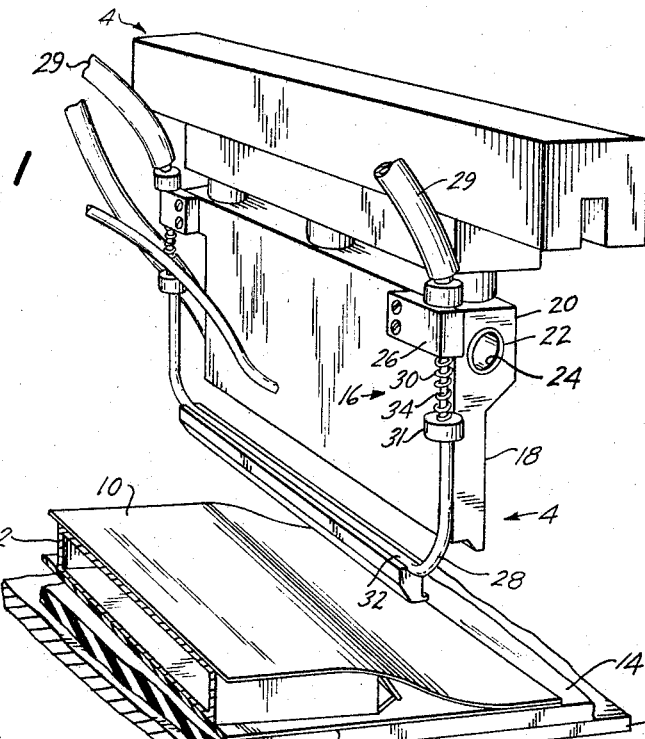
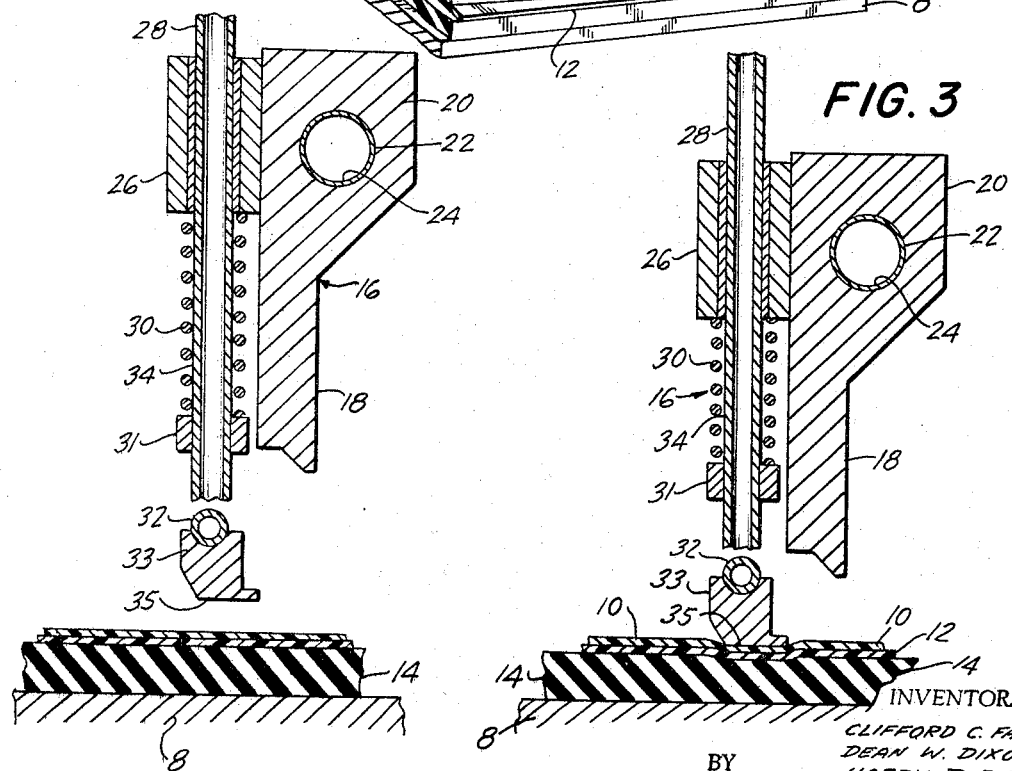
INVENTORS
CLIFFORD C. FAUST
DEAN W. DIXON
HARRY P. EICHIN
BY Barnwell R. King
ATTORNEY INVENTORS
CLIFFORD C. FAUST
DEAN W. DIXON
HARRY P. EICHIN
BY Barnwell R. King
ATTORNEYS 3,334,004
APPARATUS FOR CUTTING AND RADIANT HEAT SEALING THERMOPLASTICS
Clifford C. Faust, La Grange, Dean W. Dixon, Worth, and Harry P. Eichin, Western Springs, Ill., assignors to Union Carbide Corporation, a corporation of New York
Filed Feb. 25, 1964, Ser. No. 347,210
1 Claim. (Cl. 156—499)

This invention relates to the art of heat sealing superimposed thin films of highly oriented thermoplastic films, such as those used for shrink packaging.

More particularly, the invention provides a novel method of and means for severing and sealing by fusing with a unique melt-back bead seal, the mouth of a bag of biaxially oriented polypropylene film, for example.

According to the invention plies of highly oriented film are fused with a minimum of transverse shrink by a composite heat sealing unit including a heated sealing bar coacting with heat-absorbing clamping means to impress the superimposed film plies against a resilient work surface. The sealing bar operating surface is contoured to deform the resilient work surface adjacent the distal edge of the bar to thereby melt-sever the clamped film plies by contact, and in combination with the clamp foot, urge the plies toward a sloping, heat-radiating surface to thereby concomitantly shrink the plies toward the clamp and propagate and enlarge the melt into a fused bead seal.

The contour and proportions of the sealing bar, and spacing therefrom of the clamping means have been found to be as important as operation at preferred time, temperature and pressure values to obtain an optimum strength seal having minimum transverse shrinkage in highly oriented films.

The composite heat seal unit of this invention comprises means acting to perform the following steps in heat sealing the film plies at the mouth of a bag, for example: isolate tension in both film plies intermediate the bag's mouth and the enveloped packaged item; melt-sever and fuse the film plies of the surplus film at the bag mouth from the body of the bag; urge both plies of film intermediate the clamp and severed ends toward a heat radiating surface of the sealing bar and progressively enlarge the fusion seal of the plies as they shrink toward the clamp; restrain transverse shrinkage of the seal during cooling.

It is believed that the new bead seal is formed by the tensionless melting and blending of the differences in the state of structure of the highly oriented parent film and the unoriented melt bead. Upon cooling, the bead thus provides at the junction of the plies a uniformly strong seal along the plies length.

Biaxially oriented polypropylene (Bior. P.P.) film is an excellent packaging material because of its superior clarity and gloss; strength and durability; stiffness and hand; and is very useful in the high speed wrapping of articles; and for its chemical resistance and barrier properties.

Bior. P.P. film is used for shrink packaging of enveloped items and is superior to other films in this respect, because it has about 25% more shrink and the relatively high tensile strength of commercial shrink films.

A measure of stiffness in unsupported films is the bending modulus which, in the case of Bior. P.P. film is about five times greater than polypropylene (P.P.) or polyethylene (P.E.) films as normally extruded.

However, the film's high shrink and stiffness and its high temperature sealing range combine to make Bior. P.P. extremely difficult to heat seal.

One of the problems with prior art heat sealing apparatus used on Bior. P.P. films is the poor seal strength, nonuniformity and inconsistency in seal strength. Oriented film must be heat sealed by specifically designed sealers and under controlled conditions to minimize or prevent distortion, shrinkage and pinholing. The relatively high sealing temperature (600°–650° for Bior. P.P. vs. 550°–600° for Bior. P.E.) accentuates the differential shrinkage between two different plies of superimposed film (orientation may be greater in the film's machine direction, M.D., than in the transverse direction, T.D.), when making an extended line seal such as a closure for a bag's mouth. The high shrinkage (T.D. and M.D.) resulting from the substantial orientation stresses residual in the plies of the film as the heat seal is formed, has a tendency to pucker and attenuate the parent film of the plies adjacent the seal, that acts in a manner to destroy the continuity of the seal.

Union Carbide's UDEL X–1 Bior. P.P. 0.001 inch thick has a parent film strength of about 24 to 26 pounds per inch width. When two plies of this 0.001 inch thick film are heat sealed by prior art methods such as an impulse type hot wire sealer, the seal has a nonuniform strength that averages about 4.0 pounds per inch width (15% parent film strength) and may have single test specimens with seal strength of about one pound per inch. Prior art transverse shrinkage (along the heat seal) is about 10% of the present film width.

Seal strength test data is determined by cutting at least two samples at random from each of the bag seals (about 8"–10" width) in a test set. The specimen samples are tested on an Instron tensile tester (A.S.T.M.–D882, D638) and the average, median and minimum strength of the samples are recorded.

Wide usage of bioriented polypropylene films for shrink packaging of items has been held up for want of a satisfactory heat seal. Currently, mainly phonograph record pouches and similar items not requiring a high strength seal are commercially packaged in this film. Difficulty in making high strength and uniform heat seals in oriented shrink films and the resultant excessive puckering of the seal, have hindered the wider adoption of this very desirable class of films. Thus, a problem is to provide heat seals that are strong and uniform in Bior. P.P. film plies with minimum pucker.

Normal shrink packaging techniques for bag or sheet enveloped items demand uniform, elongated weld seals fusing the enveloped plies of film adjacent the item to be packaged and having a minimum of film surplus outward from the seal.

The invention provides a novel method of sealing oriented thermoplastic film plies, which comprises isolating tension in such plies spaced adjacent the desired seal, fusing and melt-severing the so-tension-isolated plies, and exposing the so-fused free ply ends to a heat radiating source to enlarge the resulting fusion seal, while restraining transverse shrinkage of such seal until cooling occurs. The invention also provides for a novel combination of means for carrying out such method.

In the drawings:

FIG. 1 is a fragmentary perspective view of apparatus illustrating the invention;

FIGS. 2–4 are fragmentary vertical sectional views of such apparatus in different operational stages;

Figure 4:
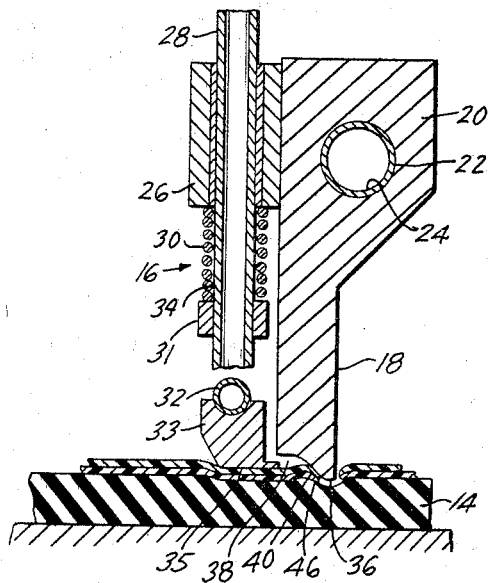

As shown in FIG. 1 a flat paperboard carton 2 is provided with an overlapping film ply 10 and an underlying film ply 12, the end portions of which extend beyond the end of such carton under heat sealer 4. Such carton and film plies are disposed on a cushion 14, such as a sheet of silicon-rubber, that in turn is disposed on a metal base 8 having a flat upper surface.

Referring to FIG. 2, the upper film ply 10 (for clarity the plies are exaggerated in thickness) and lower film ply 12 are superimposed on the resilient work surface and indexed to a sealing position underneath a composite sealing assembly 16 of the sealer. Sealing assembly 16 is reciprocated vertically to and from work surface 14 by motor means such as a conventional air cylinder and guide rods (not shown). In FIGS. 1 and 2, assembly 16 is shown in retracted position.

The assembly includes a hot sealer bar 18 having on its distal side a broad upper portion 20 the top surface of which is fastened to the motor means and insulated therefrom by heat insulators 21. Upper portion 20 has a bore 22 having mounted therein an electrical resistance heater element 24.

Sealer bar 18 has fastened adjacent each upper end of its proximal side, sleeves 26, 26. Sleeves 26, 26 are vertically bored to slidably mount a U-shaped clamping member 28, such as stainless steel tubing or conduit, that is resiliently urged from the upper portion 20 by compression springs 30, 30. Clamping member 28 has a horizontal portion 32 connected to vertical runners 34, 34 slidably mounted in sleeves 26, 26. The runners are provided with the compression springs 30, 30 located above stops or retainers 31, 31. Cooling fluid is circulated through the conduit via hose connections 29, 29. Horizontal portion 32 has brazed thereto an elongated clamp foot or shoe 33 having a flat bottom surface 35.

FIG. 3 shows the heat sealing assembly 16 advanced about 25% of its travel toward work surface 14. The bottom surface 35 of foot 33 has been urged into contact wtih superimposed film plies 10, 12 clamping them onto the resilient work surface provided by cushion 14.

FIG. 4 shows heat sealing assembly 16 completely advanced with respect to the resilient work surface. The bottom of heat seal bar 18 has a unique and novel contoured sealing surface shaped to perform the several functions required to heat seal oriented films. A primary or severing surface 36 adjacent the distal side of bar 18 initially contacts the film plies and presses them into work surface and severs the plies by melting. Surface 40 that connects and is intermediate surface 38 and severing surface 36, is sloped or curved to allow a bead seal 46 to form in the space intermediate the surfaces 38 and 14.

Figure 5:
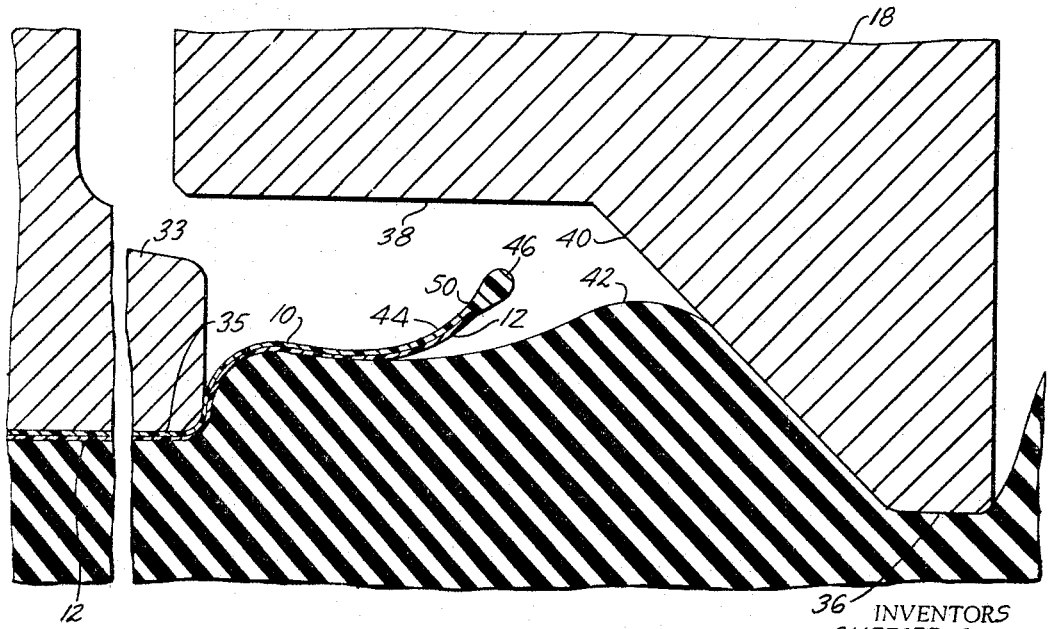
FIG. 5 is a greatly enlarged fragmentary view in cross-section of another stage in the operation of the apparatus.

In FIG. 5 the film plies 10, 12 are drawn to the same scale as the sealer bar 18 and foot 33. While not completely understood, it is believed that immediately after melt-severing of the plies by surface 36, the stiff film of the residuum plies of free portion 44 starts to curl upwardly and shrink; then, assisted by bulge 42 of the deformed rubber surface, the fused edge portion of the plies is further urged toward heat-radiating surfaces 38, 40. Heat radiating from bottom surfaces 38, 40 of sealer bar 18, further propagates the melting of the fused edge elevated from the bulge 42 and the free-standing plies melt back into the parent film in the form of a relatively thick and strong free-standing bead seal 46.

The bottom surface 35 of clamp foot 33 clamps the film plies onto the work surface and thereby assists in elevating the residuum portion 44 from bulge 42 to form bead 46. The residuum portion 44 of the plies is free to shrink toward the clamp foot 33, but is restrained in transverse shrink as the bead is formed and cooled by being clamped against the work surface.

Figure 6:
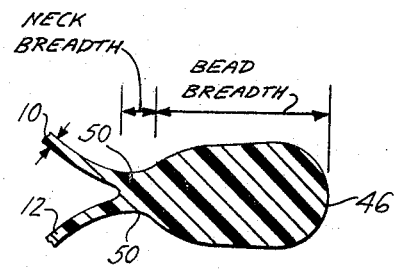
FIG. 6 is an enlarged fragmentary cross-section of a seal made by the invention.

FIG. 6 shows an enlarged cross-section of a typical bead seal 46, formed with a preferred embodiment under conditions of the following Example I. Using the film of Example I of a ply thickness X, it has been found that a ply length of from 35X to 60X is melted by the method of the invention into a bead of about 6X to 10X thickness and 12X to 20X breadth, including a neck portion 50 of about 2X breadth.

Example I

As an example, in the sealing of Union Carbide's UDED X–1 bioriented polypropylene film; two piles, each one mil thick was heat-sealed with a seal strength about 75% of parent film strength and with a transverse shrinkage of less than about 3%, using a preferred heat seal bar of this invention at 700° F., for a sealing interval of 1.0 second at a pressure of about eleven pounds per inch of length.

The work surface was a 3/16 inch thick pad of heat-resistant rubber of about 50 durometer (Shore).

The preferred bar was about 1/4 inch thick at the sealing surface and had a bottom severing surface 36 about 1/32 inch wide and a sloped heat-radiating surface 40 at an angle of about 55° to 65° from the vertical. The distal edge of clamp foot surface 35 was positioned below and about aligned with the proximal edge of surface 40.

Example II

Using the similar film as in Example I, seals of about 66% of parent film strength were obtained with a shrinkage of less than about 3% using another heat seal bar under the same conditions as in Example I. Such bar was about 1/4 inch thick at the sealing surface and had a bottom severing surface 36 about 1/32 inch wide, and elevated therefrom a distance about 40 to 50 times the combined thickness of the film plies to be sealed, was located heat-radiating surface 38. The portion of the bar intermediate surfaces 36 and 38 was preferably inclined at an angle of about 40° to 50° from the vertical.

Various types of bar configuration having a sloped surface leading from the film severing edge of the sealing bar in combination with an independent clamp for the parent film, improve the unformity and strength of the resulting heat seals. Seal strength tests with a variety of bar configurations resulted in progressive improvements in strength and uniformity of the heat seal. Bar shapes of the preferred embodiments yield seals having a median seal strength about 70% of the parent film strength, by contrast with prior art seals of about 20% of film strength. Also, the uniformity of seals made by the preferred embodiment provides a considerable improvement over prior art.

What is claimed is:

Apparatus for heat-sealing oriented thermoplastic film material, which comprises a base including a resilient cushion for supporting overlapping plies of such material, a sealing assembly including a horizontal clamping member and an adjacent sealer bar movable vertically toward and away from such film plies on said cushion, said bar having on the bottom thereof a heat radiating surface portion adjacent said clamping member, and a downwardly inclined surface portion extending therefrom toward a severing surface portion located below such heat radiating surface portion, and means resiliently connecting said clamping member and said sealing bar so that the former engages such plies before the bar engages them, whereby when said assembly is moved toward the cushion, said member clamps the plies against the cushion, isolating tension in the film plies, the heat-severing surface portion of the bar then fusion-cuts the plies, the inclined surface portion of the bar then upsets the adjacent material of the cushion, causing the resulting so-fused edge of the plastic material to curl upwardly in the direction of such heat-radiating surface, further fusing the material along such edge into a substantial bead, and when the assembly is lifted from the material, the plies are held clamped together by said member until the bar rises above the material, permitting the so-sealed material to cool before the clamping member is elevated to release such material.

References Cited

UNITED STATES PATENTS

| 2,979,113 | 4/1961 | Stageberg | 156—515 |
| 3,087,845 | 3/1963 | Patterson | 156—306 |
| 3,243,330 | 3/1966 | Zelnick | 156—380 |

FOREIGN PATENTS 740,811  11/1955  Great Britain.

EARL M. BERGERT, *Primary Examiner.*

D. J. DRUMMOND, *Examiner.*